D. BIRMELI.
Letter and Picture-Blocks.
No. 163,912. Patented June 1, 1875.
Fig. 1　　Fig. 2　　Fig. 3
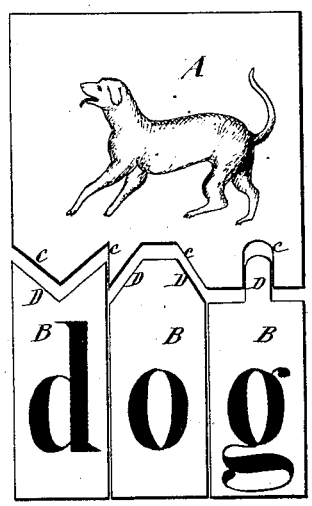  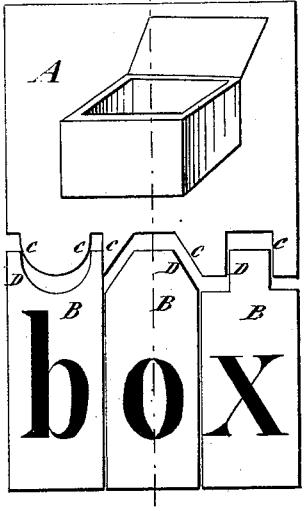
Fig. 4　　　　Fig. 5
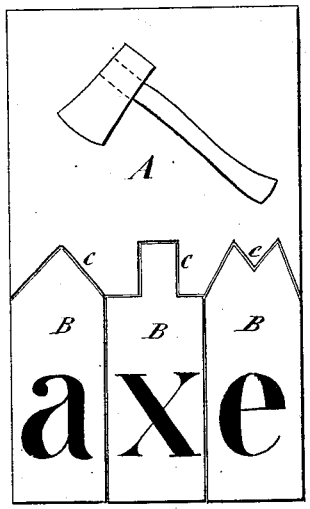 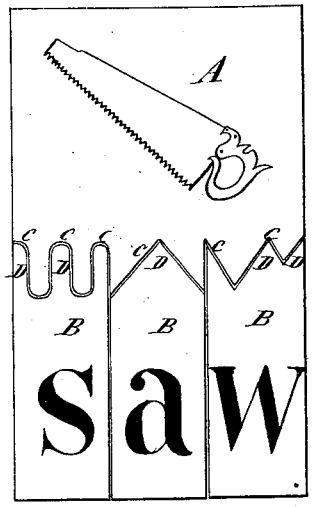
WITNESSES:
C. Neveux
A. F. Terry
INVENTOR:
D. Birmeli
BY
[signature]
ATTORNEYS.
THE GRAPHIC CO. PHOTO-LITH. 39 & 41 PARK PLACE, N.Y.

UNITED STATES PATENT OFFICE.

DANIEL BIRMELI, OF GREENVILLE, NEW JERSEY.

IMPROVEMENT IN LETTER AND PICTURE BLOCKS.

Specification forming part of Letters Patent No. 163,912, dated June 1, 1875; application filed May 1, 1875.

*To all whom it may concern:*

Be it known that I, DANIEL BIRMELI, of Greenville, in the county of Hudson and State of New Jersey, have invented new and Improved Alphabetic and Picture Blocks, of which the following is a specification:

My invention consists of a different-shaped end point or projection to each letter-block, so that no letter-block will correspond to any other, in combination with picture-blocks, having notches corresponding to the letters of the name of the picture, to aid the child in selecting the letters for naming the picture and identifying them therewith.

Figures 1, 3, 4, and 5 are plan views of three picture-blocks, with the letters of which their names are composed, connected by notches and projections peculiar to each letter in form; and Fig. 2 is a section through Fig. 3 on line $x\ x$.

Similar letters of reference indicate corresponding parts.

A represents the picture-blocks, and B the letter-blocks. The picture-blocks are contrived with notches C in the lower edge, and the letter-blocks have points or projections D, to fit in the notches for arranging the letters to name the pictures; but, unlike other picture and letter blocks for object-teaching, the form of these notches and projections vary with each letter, so that only the right letter will fit the block in the right place, thus distinguishing the letter wanted from all the others, and so serving to instruct the child by this fact, as well as by the letter itself.

Having thus described my invention, I claim as new and desire to secure by Letters Patent—

The picture-blocks A, in combination with the letter-blocks B, each of the latter having one of the letters forming the name of the pictured object, and fitting to the block A by means of grooves and projections, which vary in form for the different letters, substantially as and for the purpose set forth.

DANIEL BIRMELI.

Witnesses:
T. B. MOSHER,
ALEX. F. ROBERTS.